Dec. 16, 1952      O. W. SCHOTZ      2,621,533
TRANSMISSION CONTROL
Filed July 31, 1946      2 SHEETS—SHEET 1
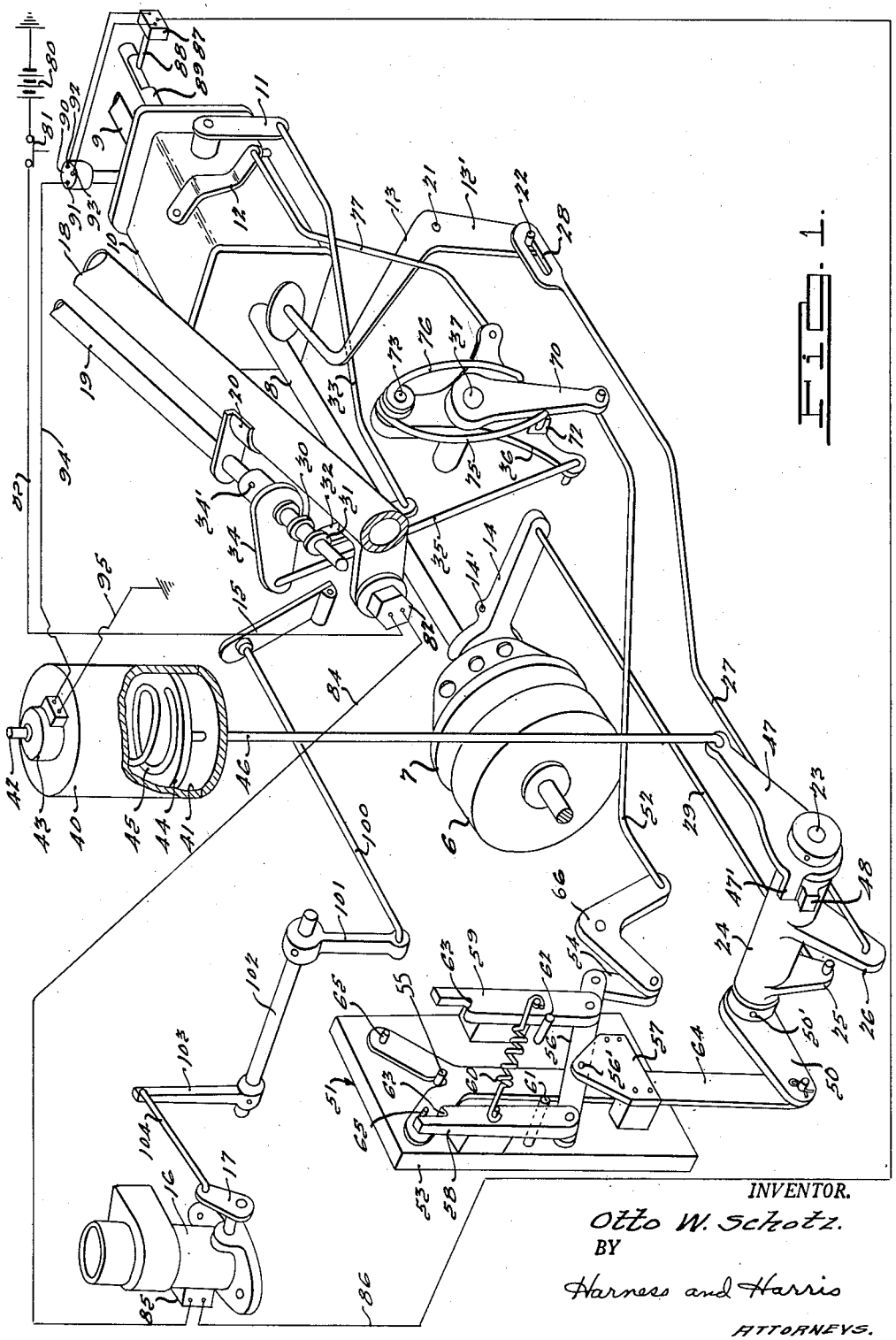
INVENTOR.
Otto W. Schotz.
BY
Harness and Harris
ATTORNEYS.

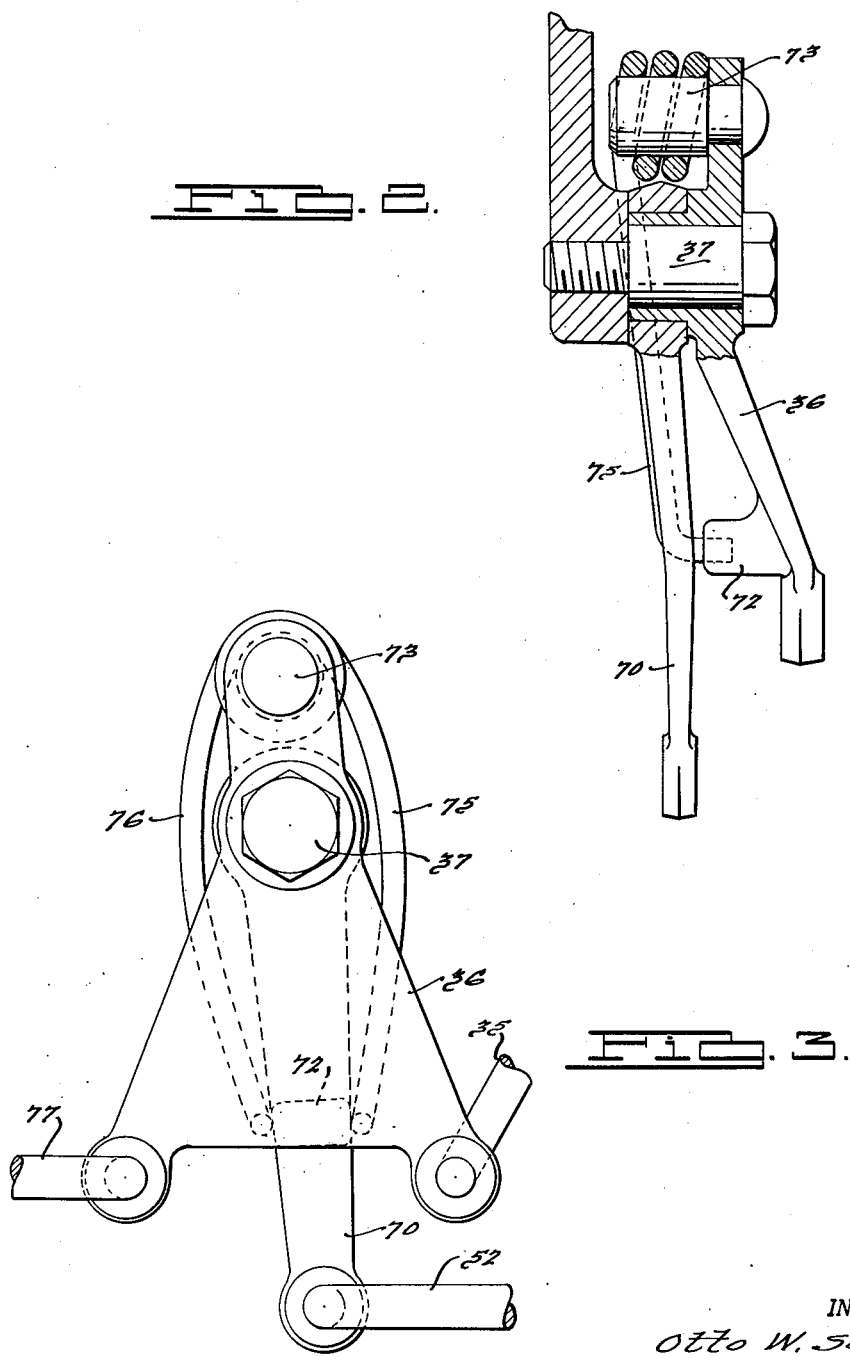

Patented Dec. 16, 1952

2,621,533

UNITED STATES PATENT OFFICE 2,621,533

TRANSMISSION CONTROL

Otto W. Schotz, Detroit, Mich., assignor to Chrysler Corporation, Highland Park, Mich., a corporation of Delaware Application July 31, 1946, Serial No. 687,247

5 Claims. (Cl. 74—335)

This invention relates to automotive vehicle transmission controls and more particularly to a means for imparting a resiliency to the mechanism adapted to transmit impulses from a control apparatus to a means for varying the speed ratio drive of a transmission.

Apparatuses for automatically changing speed ratio drives in motor vehicle transmissions have been developed. These apparatuses are usually responsive to driver signal as, for example, by the throttle closing within predetermined vehicle speed limits to initiate a cycle including a change in transmission speed ratio drive. The transmissions usually have incorporated therein a synchronizer, one type of which is illustrated and described in Patent No. 2,238,723 issued to O. E. Fishburn on April 15, 1941. A fast, non-yielding application of force to the controls of such transmissions is undesirable as the synchronizers require a time interval in which to operate and in automatic control systems it has been found necessary to incorporate a means for rendering the application of force to the transmission control lever somewhat yielding in nature. In addition the cycle in some apparatuses also includes a disengagement and reengagement of a clutch connecting the vehicle engine with the transmission. In these apparatuses it is imperative that the clutch disengagment be assured before the change in transmission speed ratio drive is forced. The use of a resilient linkage operatively connected between the prime mover of an automatic control system and the transmission shiftable members, permits the force applied to these members to be temporarily stored in the resilient linkage until the clutch is disengaged and thereby the synchronizer tooth pressure is reduced and the synchronizer's effort to align its teeth is not resisted by the vehicle engine torque.

It is usual to provide manual means for operating the clutch and changing the transmission speed ratio drive. The device to be described herein is adapted to transmit manual signals to the transmission and by-pass the resilient linkage.

It is a further object of the invention to provide a device for this purpose having a minimum thickness.

The invention will be described herein in conjunction with a suggested transmission and clutch control apparatus as a typical application thereof although it is not intended that the invention be limited to the associated apparatus described herein.

In the drawings:

Fig. 1 is a diagrammatic view of a transmission and clutch control apparatus of which my invention forms a component part;

Fig. 2 is a side view of my device partly in section; and

Fig. 3 is a front elevation of my device.

Referring to Fig. 1 the transmission and clutch control apparatus will be described. A transmission housing 10 for a standard transmission having three forward speeds and a reverse speed is illustrated as connecting driving shaft 8 and driven shaft 9. Housing 10 has a selector lever 11 and shift lever 12 pivotally mounted thereon. The fluid coupling 6 and clutch 7 operatively connected to the shaft 8, are shown in conjunction with clutch pedal 13 and clutch throw-out fork 14. Accelerator pedal 15, and carburetor 16 having throttle lever 17 rotatably mounted thereon are also illustrated. The housing 18 for the steering column is shown supporting a manual shift control rod 19 by bracket 20.

Manual means are provided in the apparatus illustrated in Fig. 1 for the operation of the clutch and control of the transmission speed ratio drive. The clutch pedal 13 is rotatably mounted at 21 on a shaft (not shown). An extension 13' of clutch pedal 13 depends below rotatable mounting 21 and has fixed thereto a pin 22. A torque shaft 23 has one end thereof rotatably mounted on the vehicle frame (not shown) and the other end rotatably mounted adjacent the engine block (not shown) in a manner well known in the art. A collar 24 is rotatably mounted on torque shaft 23. A pair of lugs 25 and 26 extending from collar 24 normal to the axis thereof form levers by which rotation of collar 24 on shaft 23 is induced and transmitted to the clutch throw-out fork 14. Lug 26 has pivotally connected thereto a rod 27 which has a slot 28 in its opposite end. Pin 22 of clutch pedal 13 cooperates with slot 28 to form a connection which will cause counterclockwise rotation of collar 24 when clutch pedal 13 is rotated counterclockwise but will permit motion of collar 24 independently of pedal 13, as an incident to automatic control to be described herein. A rod 29 operatively connects lug 25 with the clutch throw-out fork 14. It is, therefore, evident that when the vehicle driver depresses pedal 13 rod 27 is pulled to the right in Fig. 1 thereby rotating collar 24 in a counterclockwise direction and through leg 25 and rod 29 the clutch throw-out fork 14 is rotated about its conventional pivot 14' to disengage the clutch.

The manual shift control rod 19 is slidably mounted in bracket 20 and adapted for both axial and rotary movement. As is usual in the art, the axial movement is adapted to select the conventional transmission shift rail which is to be moved and rotation thereof slides the shift rail in one of two directions (depending upon the direction of rod rotation) to effect the desired transmission speed ratio drive connection. A pair of spaced circumferential collars 30 and 31 located adjacent the base of rod 19 receive therebetween the end of a lever 32 which is rotatably mounted (not shown) adjacent its mid portion to some fixed object such as a portion of the vehicle body structure. A rod 33 connects lever 32 with transmission selector lever 11. Axial movement of rod 19 is transmitted through this linkage to selector lever 11.

An arm 34 is keyed to rod 19, as by a pin 34' and has connected to the outer end thereof a depending rod 35. A bifurcated lever 36 is rotatably mounted on a shaft 37 and one arm thereof is connected to rod 35. A rod 77 connects the other arm thereof to transmission shift lever 12. Rotation of rod 19 through the linkage just described rotates shift lever 12 for manual transmission control.

Carburetor throttle lever 17 is controlled by accelerator pedal 15 through conventional linkage illustrated in Fig. 1. Rod 100 connected to accelerator pedal 15 has its other end connected to lever 101 keyed to rotatably mounted shaft 102. A lever 103 is also keyed to shaft 102 for rotation therewith and rod 104 connects lever 103 with throttle lever 17. Thus actuation of accelerator pedal 15 through rod 100, lever 101, shaft 102, lever 103 and rod 104 rotates control lever 17.

In Fig. 1 automatic means have been superimposed on the manual controls just described. An air tight housing 40 containing a cylinder 41 has a tubular connection 42 with the engine intake manifold. A solenoid valve 43 is adapted to selectively open and close this connection and vent cylinder 41. A movable element in the form of a piston 44 is slidably mounted in cylinder 41 and a spring 45 acting on piston 44 and reacting on housing 40 urges piston 44 to one end of cylinder 41. Manifold low pressure or "vacuum" as it is commonly referred to overcome spring 45 when valve 43 is open. Piston rod 46 is connected to arm 47 which is keyed to torque shaft 23. An ear 47' on arm 47 is adapted to engage a lug 48 on collar 24. When cylinder 41 is connected with the manifold through valve 43 and tubular passage 42 piston 44 is raised and piston rod 46 rotates arm 47 in a counterclockwise direction. Ear 47' engages lug 48 on collar 24 to rotate the collar and through lug 25 and rod 29 move clutch throwout fork 14 to disengage the clutch. The lost motion connection at slot 28 between rod 27 and clutch pedal 13 prevents the rotation of collar 24 from actuating the clutch pedal 13. When valve 43 closes cylinder 41 to the manifold and vents the cylinder, spring 45 returns the parts described to their original position permitting the clutch to reengage.

The movement of piston 44 also effects changes in transmission speed ratio drive. The apparatus is designed to actuate one shift rail selectively in either of two directions. In the preferred form a standard transmission having a shift rail controlling second speed and direct drive is controlled by movement of piston 44 so that the apparatus herein automatically effects changes of speed ratio drive between a relatively slow drive of the driven wheels and a relatively fast drive. Arm 50 is keyed to shaft 23 by pin 50'. An alternator, generally designated by the numeral 51 has a rod 52 operatively connected thereto. Alternator 51 is adapted to translate counterclockwise rotation of arm 50 to alternate pushing and pulling motion of rod 52. A support plate 53 is secured to a stationary object (not shown). A pin 55 projects from the surface of plate 53. A lever 56 is fulcrumed at 56' on a bracket 57 supported by plate 53. A pair of upwardly extending fingers 58 and 59 are rotatably mounted on lever 56 on opposite sides of the fulcrum 56'. Spring 60 connecting fingers 58 and 59 urges the fingers toward each other. The fingers 58 and 59 have a recessed portion with shoulders 63 adjacent the upper ends thereof. A bifurcated lever 64 is rotatably connected to arm 50 and has a pin 65 mounted on each fork thereof and adapted to engage shoulders 63. Pins 61 and 62 guide the fingers and cooperate with the arcuate parts of the connections of the fingers with lever 56 to direct the shoulder 63 portion of the fingers toward the pin 55 when the finger occupies its highest position in Fig. 1. A link 54 and bellcrank 66 transmit motion of lever 56 to rod 52. In the operation of the alternator with the parts in the positions shown in Fig. 1 downward motion of arm 50 will pull lever 64 downwardly and one pin 65 will push finger 58 downwardly thereby rotating lever 56 in a counterclockwise direction about fulcrum 56' raising link 54, rotating bellcrank 66 and pulling rod 52 to the left. With lever 56 in this position finger 59 has been raised and the portion thereof connected to lever 56 has been swung outwardly on an arc about the fulcrum 56' with the spring 60 urging the upper portion thereof to the left as far as pin 62 will permit in Fig. 1. When arm 50 is raised the bifurcated lever is centered by the cam action of pin 55 in the crotch thereof so that on its next downward movement the other pin 65 engages shoulder 63 of finger 59 to reverse the movements described above to thereby push on rod 52. Through this mechanism each successive downward motion of arm 50 reverses the movement of rod 52.

Rod 52 is connected to the device which imparts resiliency to the connection between rod 52 and the transmission control lever for the purposes set forth above. Arm 70 is rotatably mounted on a shaft 37. Rod 52 is connected to arm 70. A pin 73 is provided adjacent one end of the lever 36. The other end of lever 36 is bifurcated. Lever 36 is rotatably mounted on the shaft 37 adjacent the lever crotch. An abutment 72 is provided on lever 36 adjacent its bifurcated end. A spring centered on pin 73 has arms 75 and 76 engaging opposite sides of abutment 72 and engaging opposite sides of arm 70. One leg of lever 36 is connected by rod 77 with transmission shift lever 12. The other leg is connected by rod 35 to arm 34 of shift control rod 19. When alternator 51 pulls on rod 52 arm 70 is rotated clockwise compressing spring arm 75 and lifting it away from abutment 72. Spring arm 76 is then no longer in contact with arm 70 and acts against abutment 72 to rotate lever 36 about axis 37 until abutment 72 is aligned with rod 70 and thereby moving rod 77 and lever 12 to the left. A similar but oppositely directed motion is transmitted through the spring delay means when alternator 51 pushes on rod 52. It should be noted that the spring is adapted to store force transmitted thereto by rod 52 until shift control lever and its associated synchronizer are able to utilize the force to effect a change in transmission speed ratio drive. In addition, reference to the drawings shows a minimum thickness of the device along the axis of shaft 37. The presence of a spring does not increase the thickness of the device beyond the thickness of the arm and lever because of my novel arrangement of the component parts. This is important because the device is adapted to be installed adjacent a vehicle engine or transmission where space is at a premium.

Means to control the actuation of piston will be referred to to complete the explanation of the operation of the illustrated apparatus. A grounded source 80 of electric energy is connected through ignition switch 81 to a switch 82 by electrical conductor 83. Switch 82 is adapted to be closed when the rod 19 is placed in a predetermined position by the vehicle driver. This comprises the means by which the driver selects automatic control. It is desirable to provide a clutching means which will operatively disconnect the shift control rod 19 from the linkage when the driver selects automatic drive. This is desirable so that the shift control rod will not be moved by the automatic linkage movement. This does not form a part of the invention and has not been illustrated herein. Electrical line 84 connects switch 82 with a switch 85 adapted to be closed when the throttle is substantially closed. Line 86 connects switch 85 with a two-way shift rail switch 87 having a finger 88 thereon adapted to be engaged by abutments on an extension 89 of the transmission second and high speed shift rail. A first circuit in switch 87 is disconnected and a second circuit is connected when the shift rail has completed its shift. This switch movement alternates with each transmission speed ratio change on the second and high speed shift rail. A vehicle speed responsive governor 90 has one outlet terminal 91 and two inlet terminals 92 and 93 and is adapted to connect the outlet terminal with one inlet terminal below a predetermined speed and with the other inlet terminal above the predetermined speed. Each inlet terminal is connected to one of the circuits referred to for switch 87. Line 94 connects governor terminal 91 with solenoid valve 43 in manifold line 42. Line 95 grounds the circuit. Valve 43 is adapted to connect cylinder 41 with the manifold line 42 when energized and to close line 42 and vent cylinder 41 to atmosphere when not energized.

In the operation of the apparatus when the driver closes the throttle lever 18 above a predetermined vehicle speed, valve 43 is energized to admit vacuum to cylinder 41. Piston 44 is raised and clutch 7 disengaged through the linkage 46, 47, 47', 48, 24, 25, 29, and 14. This motion of the piston also causes a delayed movement of transmission shift lever 12 through arm 47, shaft 23, aternator 51, rod 52, arm 70, lever 36, rod 77, and shift lever 12. The change in speed ratio drive caused by moving shift lever 12 moves the shift rail extension 89 breaking the circuit at switch 87 thereby deenergizing solenoid valve 43 and permitting spring 45 to move piston 44 to the lower end of the cylinder and permitting the clutch to reengage. The switch 87 is now connected for its other circuit preparatory to a repetition of the process when the driver closes throttle lever 17 below a predetermined governor speed. A transmission downshift is then effected in a manner similar to that described above.

Features of novelty disclosed but not claimed herein are more particularly described and claimed in the copending applications of Carl A. Neracher, Serial No. 661,298; Otto W. Schotz, Serial Nos. 687,248, 698,451 and 755,661; and Maurice C. Robinson, Serial No. 755,612.

I claim:

1. In a motor vehicle control system adapted to change a transmission speed ratio drive, a movable element, means to move said element under selected vehicle operating conditions, an operative connection between said element and said transmission, said connection including a first lever rotatably mounted on an axis, a second lever rotatably mounted on said axis, a spring mounted on one of said levers on one side of said axis and reacting against the other of said levers on the other side of said axis, said first lever being connected to said element and said second lever being connected to said transmission whereby actuation of said element stores energy in said spring to effect a cushioned movement of said second lever to effect a change in speed ratio drive in said transmission.

2. In a motor vehicle control system adapted to change a transmission speed ratio drive, a movable element, means to actuate said element under selected vehicle operating conditions, an operative connection between said element and said transmission, said connection including a first lever rotatably mounted on an axis, a second lever rotatably mounted on said axis, a spring mounted on one of said levers on one side of said axis and reacting against the other of said levers on the other side of said axis, said first lever being connected to said element on said other side of said axis and said second lever being connected to said transmission on said other side of said axis whereby said spring transmits motion from said element to said transmission through said second lever.

3. In a control system for a motor vehicle variable speed ratio transmission, a lever pivotally mounted on an axis, an operative connection of said lever to said transmission, a power shift mechanism, a second lever rotatably mounted on said axis and operatively connected to said mechanism, a coil spring supported on a second axis and operatively connecting said levers, whereby motion of said mechanism is transmitted through said spring to said transmission.

4. In a control system for a motor vehicle variable speed ratio transmission, a lever pivotally mounted on an axis, an operative connection of said lever to said transmission, a power shift mechanism, a second lever rotatably mounted on said axis and operatively connected to said mechanism, both of said operative connections being located on one side of said axis, a spring mounted on one of said levers on the other side of said axis, extensions on said spring extending to positions adjacent said connections and abutting portions of said levers whereby motion imparted to said second lever by said mechanism is transmitted to said first lever through said spring.

5. In a control system for a motor vehicle variable speed ratio transmission, a lever pivotally mounted on an axis, an operative connection of said lever to said transmission, a power shift mechanism, a second lever rotatably mounted on said axis and operatively connected to said mechanism, said levers being in close contact with each other adjacent said axis and one of said levers having a portion extending beyond said other lever in one direction relative to said axis, a spring mounted on said portion and having legs thereof engaging both of said levers whereby a minimum of thickness along said axis is obtained and whereby motion imparted to said second lever by said mechanism is transmitted to said first lever through said spring.

OTTO W. SCHOTZ.

REFERENCES CITED

The following references are of record in the file of this patent:

UNITED STATES PATENTS

| Number | Name | Date |
| --- | --- | --- |
| 1,493,301 | Walker | May 6, 1924 |
| 2,136,023 | Russell | Nov. 8, 1938 |
| 2,397,883 | Peterson et al. | Apr. 2, 1946 |
| 2,398,407 | Brownyer | Apr. 16, 1946 |
| 2,402,343 | Price | June 18, 1946 |